(12) United States Patent
Rogers et al.

(10) Patent No.: US 11,754,216 B2
(45) Date of Patent: Sep. 12, 2023

(54) TOP REPAIRABLE GAS-CHARGED BLADDER TYPE PULSATION DAMPENER

(71) Applicant: Performance Pulsation Control, Inc., Richardson, TX (US)

(72) Inventors: John Thomas Rogers, Garland, TX (US); Cersten Jantzon, Kingwood, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 0 days.

(21) Appl. No.: 17/566,140

(22) Filed: Dec. 30, 2021

(65) Prior Publication Data

US 2022/0205575 A1 Jun. 30, 2022

Related U.S. Application Data

(60) Provisional application No. 63/132,132, filed on Dec. 30, 2020.

(51) Int. Cl.
*F16L 55/053* (2006.01)

(52) U.S. Cl.
CPC .................. *F16L 55/053* (2013.01)

(58) Field of Classification Search
CPC .... F16L 55/053; F16J 3/02; F15B 2201/3157; F15B 2201/205
USPC ..................................................... 138/26, 30
See application file for complete search history.

(56) References Cited

U.S. PATENT DOCUMENTS

| | | | |
|---|---|---|---|
| 2,278,668 A * | 4/1942 | Piety | H03D 3/00 324/76.76 |
| 2,757,689 A | 8/1956 | Knox | |
| 3,379,215 A | 4/1968 | Greer et al. | |
| 3,788,627 A | 1/1974 | Wieland | |
| 3,948,287 A | 4/1976 | Sugimura et al. | |
| 3,960,179 A * | 6/1976 | Zahid | F16L 55/053 138/30 |
| 4,069,844 A * | 1/1978 | Zahid | F16L 55/052 138/30 |
| 4,099,545 A * | 7/1978 | Zahid | F16L 55/053 138/30 |

(Continued)

FOREIGN PATENT DOCUMENTS

| | | | |
|---|---|---|---|
| GB | 2062103 A | 5/1981 | |
| JP | 4856568 B2 | 1/2012 | |

OTHER PUBLICATIONS

Invitation to Pay Additional Fees and, Where Applicable, Protest Fee dated Feb. 25, 2022 in connection with International Patent Application No. PCT/US2021/065680, 2 pages.

(Continued)

*Primary Examiner* — Patrick F Brinson

(57) ABSTRACT

Top repairable gas-charged pulsation dampener designs include one or both of a threaded cover for bladder replacement and a standardized bladder with a double convex, anti-extrusion bladder button. The threaded cover, which speeds up bladder replacement over bolt-on covers, preferably has a two-piece construction to reduce torsion on the bladder neck. The bladder design, which includes a double convex, anti-extrusion bladder button, facilitates use of the same bladder design in both top repairable and bottom repairable gas-charged pulsation dampeners.

11 Claims, 10 Drawing Sheets

(56) References Cited

U.S. PATENT DOCUMENTS

| | | | | |
|---|---|---|---|---|
| 4,274,446 A | * | 6/1981 | Zahid | F15B 1/14 |
| | | | | 220/721 |
| 4,291,726 A | * | 9/1981 | Zahid | F15B 1/14 |
| | | | | 220/721 |
| 2019/0257462 A1 | | 8/2019 | Rogers | |

OTHER PUBLICATIONS

International Search Report and Written Opinion of the International Searching Authority in connection with International Application No. PCT/US2021/065680 dated May 4, 2022, 11 pages.

* cited by examiner

TOP REPAIRABLE GAS-CHARGED BLADDER TYPE PULSATION DAMPENER

CROSS-REFERENCE TO RELATED APPLICATIONS

This application claims priority to U.S. Provisional Patent Application No. 63/132,132 filed Dec. 30, 2020. The content of the above-identified patent document(s) is incorporated herein by reference.

TECHNICAL FIELD

The present application relates generally to pulsation dampeners and, more specifically, to maintenance of gas-charged pulsation dampeners.

BACKGROUND

Pulsation control in fluid transfer systems is in constant need of improvement. Among the desirable improvements are facilitating repair or reconditioning of installed pulsation dampeners. A pulsation dampener is normally removed during repair, halting production from the associated well(s) and impacting profitability of the installation.

SUMMARY

Employing conventional gas charged dampener (or, equivalently for purposes of this disclosure, "dampener", "damper," "accumulator," or "pulsation control equipment") generally involves a pressure containment vessel in cylindrical, spherical, torospherical or similar shape in which resides a bladder (or, equivalently for purposes of this disclosure, "diaphragm" or "bellows") that contains a nitrogen gas pre-charge. This conventional design has been adapted for use in drilling and all other industrial markets for positive displacement reciprocating piston/plunger pumps.

Top repairable gas-charged pulsation dampener designs include one or both of a threaded cover for bladder replacement and a standardized bladder with a double convex, anti-extrusion bladder button. The threaded cover, which speeds up bladder replacement over bolt-on covers, preferably has a two-piece construction to reduce torsion on the bladder neck. The new bladder design, which includes a double convex, anti-extrusion bladder button, facilitates use of the same bladder design in both top repairable and bottom repairable gas-charged pulsation dampeners.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged pump discharge piping or system to control or partially control pulsation amplitudes.

Pulsation control in reciprocating-pump fluid transfer systems is often implemented by one of three categories of pulsation dampener: First, gas-charged pulsation dampeners include a vessel having a flexible diaphragm separating pumped fluid entering the vessel from pressurized gas (e.g., nitrogen), where pumped fluid pressure pulsations are ameliorated by compression and re-expansion of the gas. Second, "charge-free" pulsation dampeners include a vessel housing a gas-containing microcellular elastomeric material compressing and re-expanding in response to pumped fluid pressure pulsations, thereby attenuating the magnitude of such fluid pressure surges. Finally, "maintenance-free" reactive pulsation dampeners rely on compressibility of a mixture of pumped fluid and air within a vessel, together with flow path restriction(s) and/or redirection, to attenuate the magnitude of fluid pressure pulses.

Of the three categories described above, gas-charged pulsation dampeners typically require the most frequent maintenance. Precharging (charging the pulsation dampener with nitrogen gas after installation, prior to operation) and recharging (replenishing the nitrogen gas charge to a preferred gas pressure) is normally required more often than other types of maintenance, but rupture of and/or gas leakage by the flexible diaphragm may necessitate replacement of that component.

Figure 1:
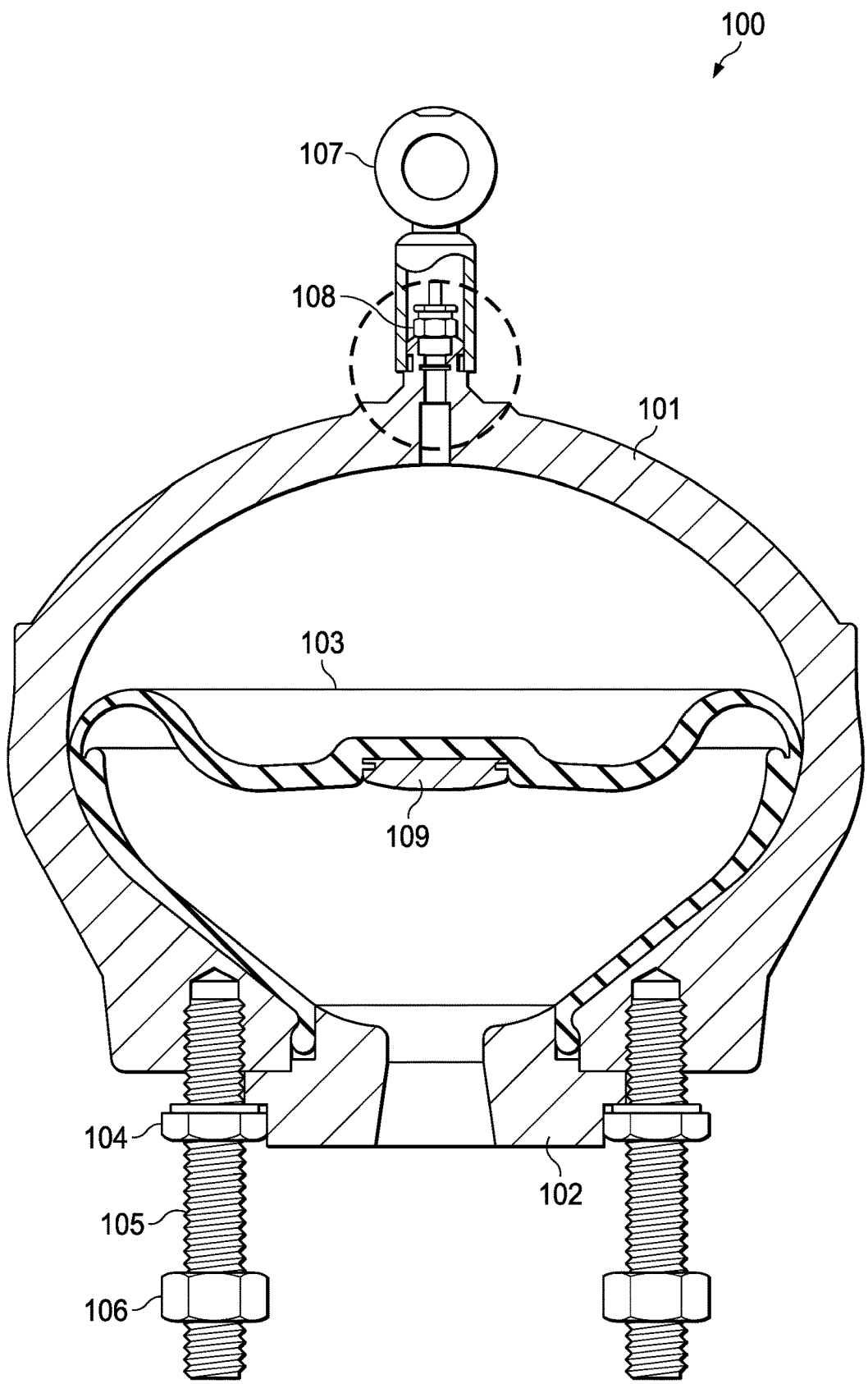
FIG. 1 illustrates an example of a bottom repairable gas-charged pulsation dampener.

FIG. 1 illustrates an example of an older type of a bottom repairable gas-charged pulsation dampener. Pulsation dampener 100 includes a body 101 and a bottom cover plate 102 forming an enclosure within which a bladder 103 is disposed. Pressurized gas is injected into the enclosure above the bladder 103. Jam nuts 104, threaded studs 105 and nuts 106 form a connection mechanism for attaching the pulsation dampener 100 to a flange on a T section (not shown) of a pipe coupled to a pump outlet (also not shown), such that pumped fluid enters the bladder 103 through the opening in the bottom plate 102. A rim of the bladder 103 is held between the body 101 and the bottom plate 102, forming a seal between the two. A lift eye 107 provides a point of connection for lift equipment to move the pulsation dampener 100 and protection of the charging valve 108. Charging valve 108 allows the pulsation dampener 100 to be charged or recharged with gas.

Pulsation dampener 100 provides active (as opposed to reactive) dampening of pumped fluid pressure pulses. When the pump (not shown) coupled to the pulsation dampener 100 is operating, pumped fluid presses against the bladder 103. The pressure of the gas above the bladder 103 resists movement (e.g., expansion) of the bladder 103 in response to increases in pumped fluid pressure, providing active (as opposed to reactive) dampening of pumped fluid pressure pulses. That is, the resistance from the pressurized gas attenuates pressure pulses (surges) in the pumped fluid, keeping such pulses to a magnitude that is acceptable for operation of the pump system, for wear of pump system and fluid transfer network components (pipes, connectors, valves, etc.), and for structural integrity of the fluid transfer network.

The pulsation dampener 100 of FIG. 1 is bottom repairable. In designs of the type exemplified by FIG. 1, the bladder 103 is installed and replaced from the bottom of the unit. Specifically, during bladder replacement the service technician has to remove the pulsation dampener 100 from its attachment to the piping, flip the unit over, disassemble the components (i.e., remove the bottom cover plate 102 from the body 101), remove the old bladder 103 and install the new one, reassemble, reinstall on the piping, and add the precharge. Removal of the dampener from the piping attachment, moving and reoriented the dampener to access the bottom plate, and reattaching the repaired pulsation dampener to the fluid transfer network piping adds significantly to the overall time, and therefore increases the effective cost of the repair by delaying the resumption of pump operation and production. Removal, movement/reorientation, and reattachment may also require multiple service technicians—also increasing repair costs—because of the weight of the pulsation dampener 100 (which is normally substantial, since the body and cover plate are typically formed of thick steel in order to withstand the fluid pressures occurring during use).

Figure 2A:
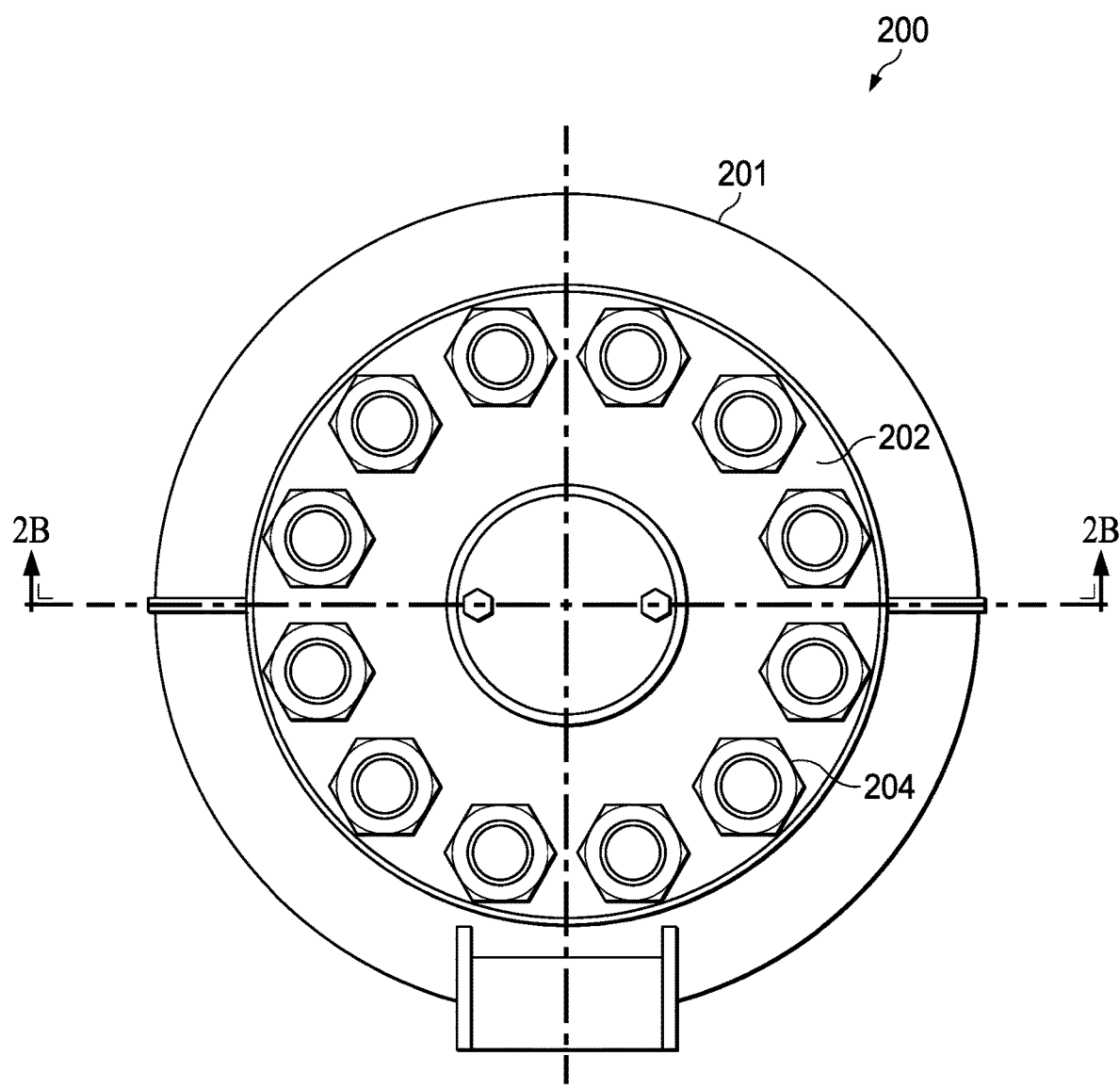
FIGS. 2A and 2B illustrate one embodiment of a top repairable gas-charged pulsation dampener.
Figure 2B:
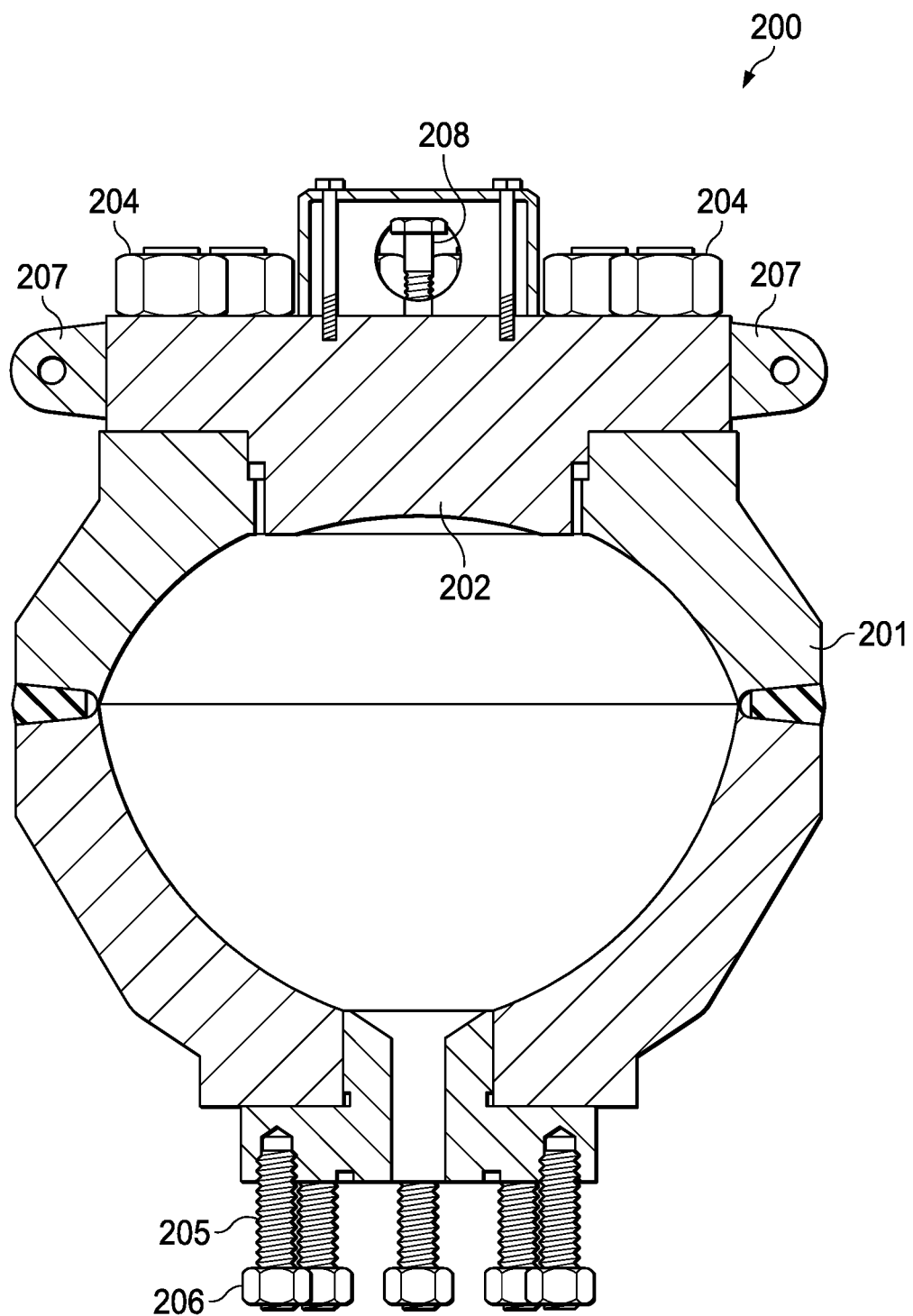

FIGS. 2A and 2B illustrate one embodiment of a top repairable gas-charged pulsation dampener. FIG. 2A is a top plan view of a top repairable gas-charged pulsation dampener 200, and FIG. 2B is a side sectional view of the top repairable gas-charged pulsation dampener 200 taken at section lines A-A. FIGS. 2A and 2B are merely exemplary, for purposes of explaining the principles of the present disclosure, and are not intended to be limiting.

Pulsation dampener 200 includes a body 201 (formed of two pieces welded together, in the example shown), a top cover plate 202 and, in the example shown, a bottom cover plate 209 forming an enclosure. The top cover plate 202 is secured by bolts 204 (twelve, in the example shown) extending through holes within the top cover plate 202 into aligned threaded holes within the body 201—although threaded studs from the body 201 extending through holes within the top cover plate 202 secured by nuts may alternatively be used. The bottom cover plate 209 includes threaded studs 205 and nuts 206 forming a connection mechanism for attaching the pulsation dampener 200 to a flange on a T section (not shown) of a pipe coupled to a pump outlet (also not shown), such that pumped fluid enters the enclosure of the pulsation dampener 200 through the opening in the bottom cover plate 209. Pulsation dampener 200 also includes lift flanges 207 providing connection points for lifting the pulsation dampener 200. Charging valve 208 allows the pulsation dampener 200 to be charged or recharged with gas.

Similar to the configuration of body 101 and bottom plate 102 of pulsation dampener 100, the body 201 and the top cover plate 202 of pulsation dampener 100 are configured to receive and retain the rim of a flexible bladder (not shown), holding the bladder within the enclosure of pulsation dampener 200. In pulsation dampener 100, pressurized gas is injected into the portion of the enclosure that is exterior to the bladder 103 and pumped fluid enters into the bladder interior. By contrast, in pulsation dampener 200, pressurized gas is injected into the bladder interior while pumped fluid is constrained to portions of the enclosure exterior to the bladder. As a result, the gas pressure in pulsation dampener 200 attenuates pumped fluid pressure pulses by resisting compression of the bladder, rather than by resisting expansion of the bladder. In both cases, however, gas above the portion of the bladder separating the gas from the pumped fluid resists movement of the bladder in response to pressure pulses in pumped fluid below.

Significant features desirable for a top repairable gas-charged pulsation dampener according to the present disclosure include gas volume and bladder interchangeability. Pulsation dampeners generally should be able to mitigate pumped fluid pressure pulses of a large magnitude with as small of a volume of gas as possible, preferably smaller than the gas volume requirements of other commercial designs. The reduced gas volume decreases the installation and operating costs. Moreover, the design of a top repairable gas charged pulsation dampener should allow the bladder to be fully interchangeable with bladder 103 in bottom repairable pulsation dampener 100. In fact, the design of the top repairable pulsation dampener will preferably allow use of the bladder from commercial products (including bottom repairable designs) sold by multiple vendors, simplifying bladder replacement by eliminating any need to identify the correct bladder design and reducing the number of components that must be kept in inventory to minimize downtime across multiple pump installations.

Figure 3A:
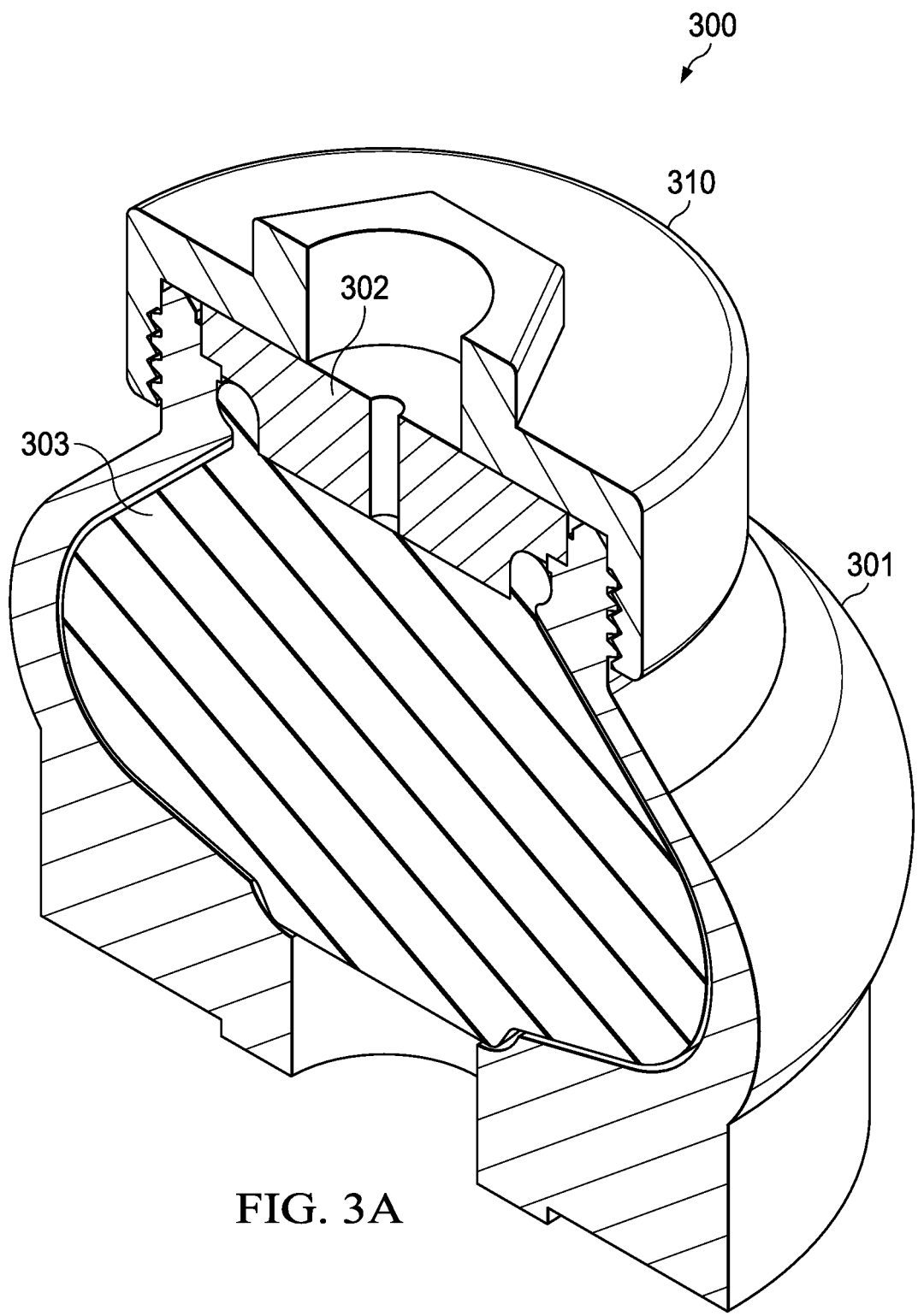
FIGS. 3A through 3C illustrate a top repairable gas-charged pulsation dampener in accordance with embodiments of the present disclosure.
Figure 3B:
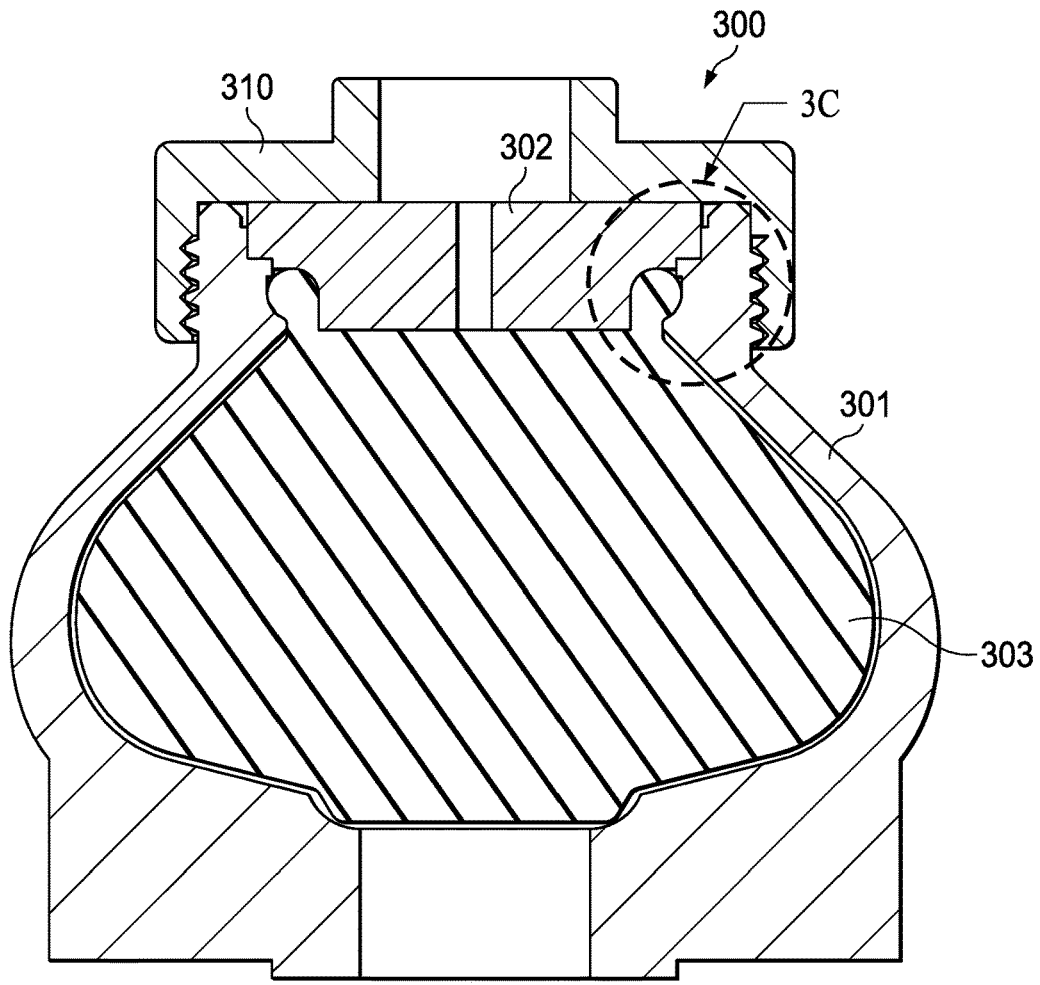
Figure 3C:
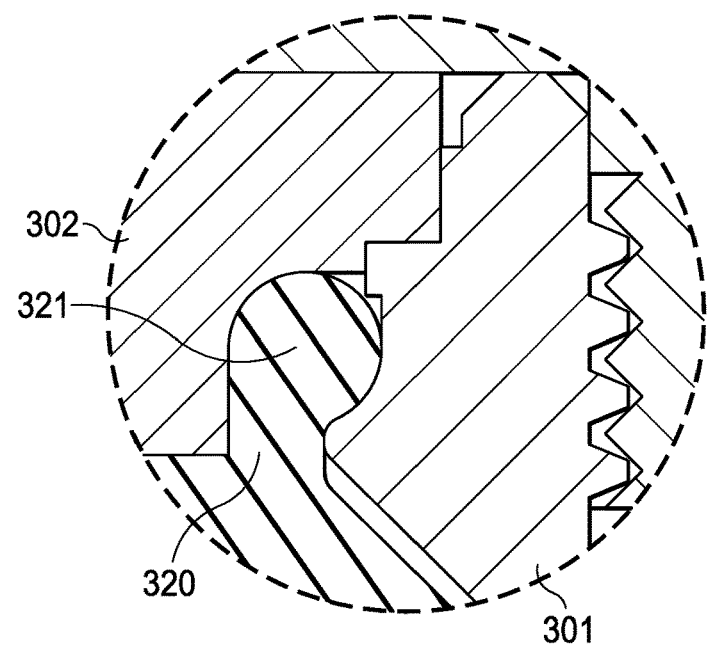

FIGS. 3A through 3C illustrate a top repairable gas-charged pulsation dampener in accordance with embodiments of the present disclosure. FIG. 3A is a perspective sectional view of a top repairable gas-charged pulsation dampener 300, and FIG. 3B is a side sectional view of the top repairable gas-charged pulsation dampener 300 while FIG. 3C is a detail of a portion of FIG. 3B. FIGS. 3A through 3C are merely exemplary, for purposes of explaining the principles of the present disclosure, and are not intended to be limiting.

In general, the structure and operation of top repairable gas-charged pulsation dampener 300 are similar to that of pulsation dampener 200. That is, similar to pulsation dampener 200, pulsation dampener 300 includes a body 301 and a pusher plate 302 forming an enclosure within which is disposed a bladder 303 (shown in a fully expanded state). However, for simplicity and clarity, description of features that are duplicative is omitted. For example, those skilled in the art will understand that threaded studs (not shown) mounted within the bottom of pulsation dampener 300 will allow the pulsation dampener 300 to be attached to a piping flange.

One difference between pulsation dampener 300 and pulsation dampener 200 is that the bottom cover plate in integrally formed with the remainder of the body 301 forming an enclosure, together with pusher plate 302. A more significant difference is the manner in which the pusher plate 302 is secured to the body 301. Pusher plate 302 is received by an opening in the top of body 301, resting on an internal circumferential ledge around that opening. The body 301 includes external threading around the outer circumference of the opening. A cap 310 screws onto those external threads to hold the pusher plate 302 in place. In the example shown, cap 310 includes a large hexagonal nut to facilitate tightening and loosening the cap. Using a threaded cover (cap 310, securing pusher plate 302) rather than a bolt-on top cover as shown in FIG. 2, and as commonly found in existing commercial pulsation dampener designs, may reduce the overall weight of the pulsation dampener and makes it simpler and faster to disassemble the components for replacement of the bladder.

Notably, the design of FIG. 3 uses a two-piece top cover: the pusher plate 302 and the cap 310. This reduces the tendency for torsion (twisting) of the bladder neck when the cover is secured to the body, as compared to implementing the top cover by combing the pusher plate 302 and cap 310 into one unitary piece. However, such unitary top covers may be used without departing from the principles of the present disclosure in other respects.

Bladder 303 is preferably designed to be used interchangeably in top repairable gas charged pulsation dampeners of the type illustrated by FIGS. 2 and 3 and in bottom repairable gas charged pulsation dampeners of the type illustrated by FIG. 1. This is accomplished by standardizing the bladder design in size (gas volume capacity), configuration and materials. In addition to having a size and being made of a material suitable for both top repairable and bottom repairable designs, such interchangeability may be accomplished through one or both of two aspects: the manner in which the bladder is secured within the pulsation dampener, and the structure of a metallic button on the bladder to prevent suction of bladder material into the opening for receiving/discharging pumped fluid.

FIG. 3C illustrates the manner of securing bladder 303 within the enclosure formed by body 301 and pusher plate 302. Those skilled in the art will recognize that a bladder may be secured within the enclosure of pulsation dampener 200 in the same manner. As shown, the rim of the bladder 303 includes a bridge 320 and a bulb 321, with the bulb 321 optionally, but not necessarily, having a greater thickness than the bridge 320. The area around the circumference of the pusher plate 302 and the adjacent area of the body 301 are configured to receive the bridge 320 and bulb 321, and hold those portions of the bladder neck in compression therebetween. The spacing separating the body 301 and the pusher plate 302 in areas receiving the bridge 320 is smaller in the region than in areas receiving the bulb 321. When the bridge 320 and the bulb 321 have the same thickness, greater compression is exerted on the bridge 320. If the bulb 321 is thicker than the bridge 320, the additional thickness further inhibits the bridge 320 and bulb 321 being pulled from between body 301 and pusher plate 302 when the pusher plate 302 is secured in position by cap 310. In either case, the bladder 303 is held in position by the body 301 and pusher plate 302 even against substantial force (e.g., exerted by the gas pressure within the bladder 303). Moreover, in addition to securing the bladder 303 in position, compression of the bridge 320 and bulb 321 between the pusher plate 302 and body 301 seals the interface between those two components.

Figure 4:
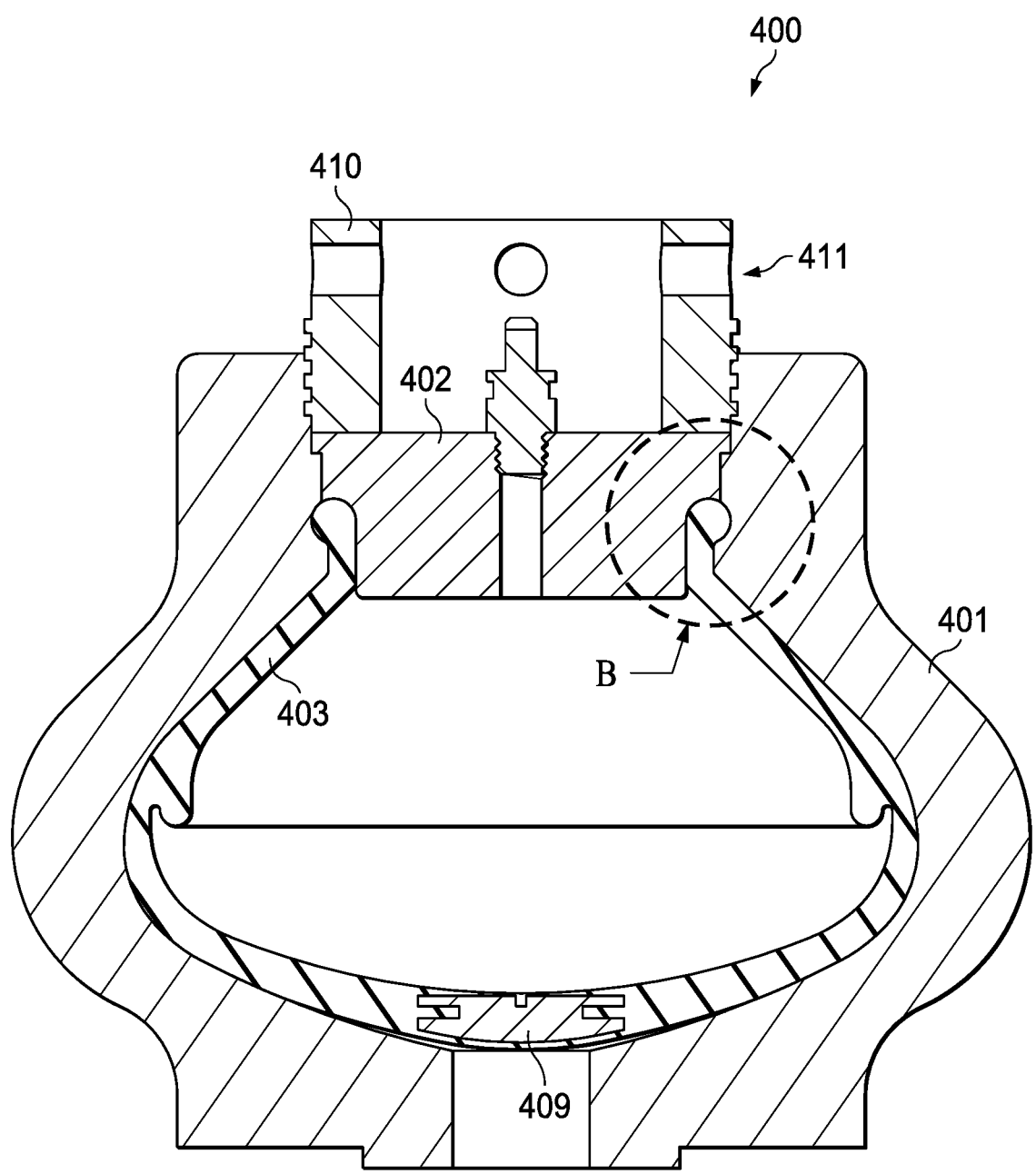
FIGS. 4 and 5 illustrate top repairable gas-charged pulsation dampeners in accordance with embodiments of the present disclosure.
Figure 5:
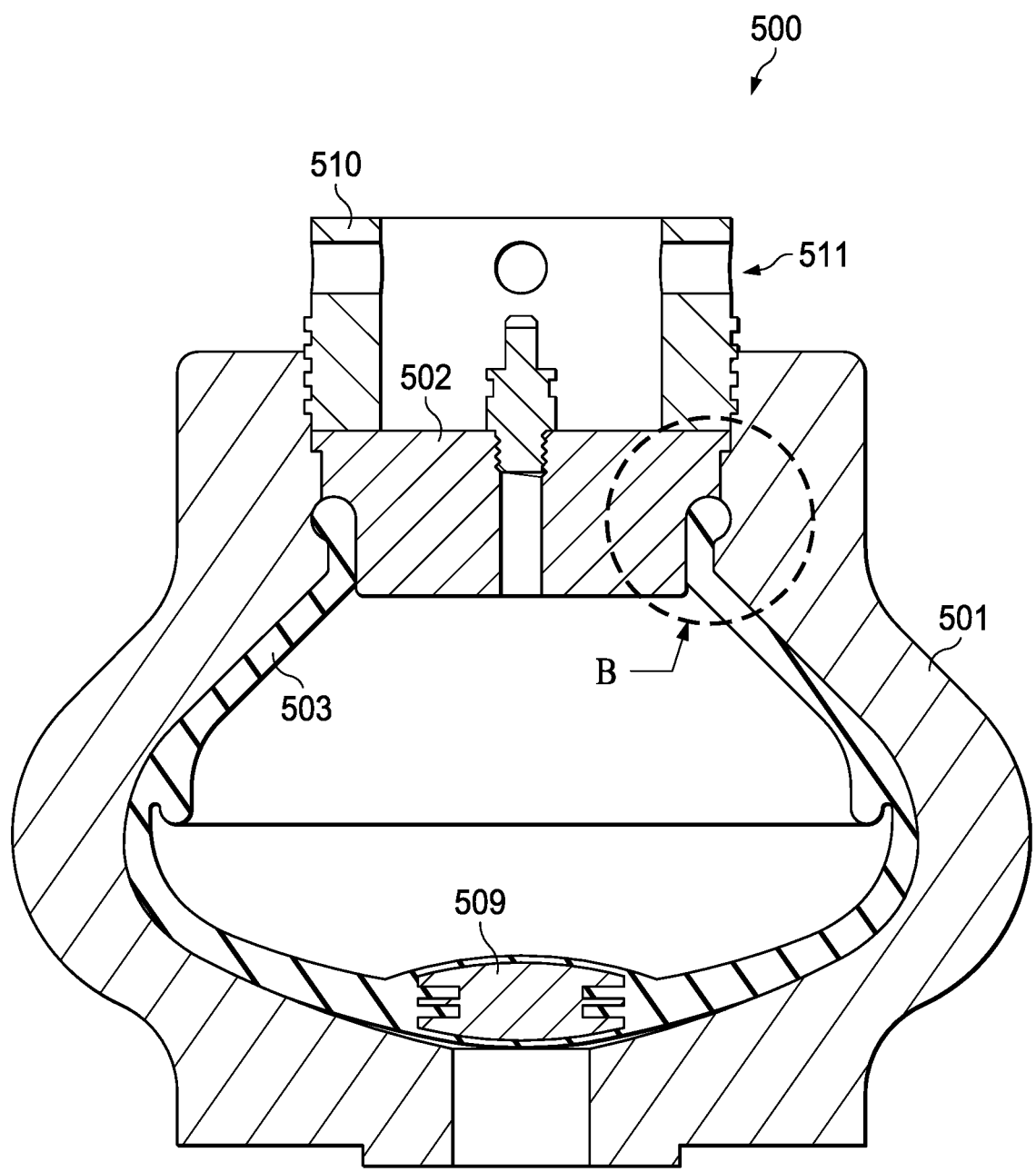

FIGS. 4 and 5 illustrate top repairable gas-charged pulsation dampeners in accordance with embodiments of the present disclosure. FIGS. 4 and 5 and side sectional views of the top repairable gas-charged pulsation dampener 400 and 500, respectively. FIGS. 4 and 5 are merely exemplary, for purposes of explaining the principles of the present disclosure, and are not intended to be limiting.

In general, the structure and operation of top repairable gas-charged pulsation dampeners 400 and 500 are similar to that of pulsation dampener 200 and pulsation dampener 300. Similar to pulsation dampeners 200 and 300, pulsation dampeners 400, 500 each includes a body 401, 501 and a pusher plate 402, 502 forming an enclosure within which is disposed a bladder 403, 503. The manner in which bladder 403, 503 is secured in position is the same as that described above for bladder 303, and the bladder 403, 503 is designed for use interchangeably within top repairable and bottom repairable gas charged pulsation dampeners. Accordingly, as with the embodiment of FIG. 3, repetitive description of features that are duplicative is omitted for simplicity and clarity.

Rather than a cap 310 as in the design of FIG. 3, the embodiments of FIGS. 4 and 5 utilize an externally threaded plug 410, 510 for securing the pusher plate 402, 502 in position relative to the body 401, 501. The plugs 410, 510 are received by internal threading in the respective body 401, 501, and may include a through-hole 411, 511 for receiving a bar for tightening and loosening the plug. Although illustrated in the two-piece construction preferable to reduce torsion on the bladder neck, a unitary top cover formed by combining pusher plate 402/502 and plug 410/510 may be used as discussed above. The use of plug 410 or 510 rather than a cap may further reduce overall weight, and provides a securing mechanism that is shorter in height, not protruding as far above the body 401 or 501.

Referring back to FIG. 1, in the embodiment depicted a single convex, anti-extrusion button 109 is affixed to the bladder 103. The convex button 109 has a flat surface abutting the material of the bladder 103 and a convex surface on the opposite side. The convex side points towards the bladder's neck, which is the embodiment of FIG. 1 surrounds the opening through which pumped fluid enters and leaves the enclosure of pulsation dampener 100. The button 109 serves to prevent the bladder 103 from being sucked into that opening by abrupt, large changes in pumped fluid pressure from positive (expanding bladder 103) to negative (creating a vacuum in the opening). The bladders 403, 503 are similarly equipped with a button 409, 509, embedded within the bladder material (e.g., during molding) rather than affixed to a surface of the bladder material. For the top repairable design of FIG. 4, the convex side of the button 409 points away from the bladder's neck, toward the opening for receiving/discharging pumped fluid. In FIG. 5, the bladder 503 includes a double convex button 509, having convex sides both pointing toward and pointing away from the bladder's neck. The double convex design contributes to interchangeable use of bladder 503 in either bottom repairable or top repairable gas-charged pulsation dampeners.

Figure 6A:
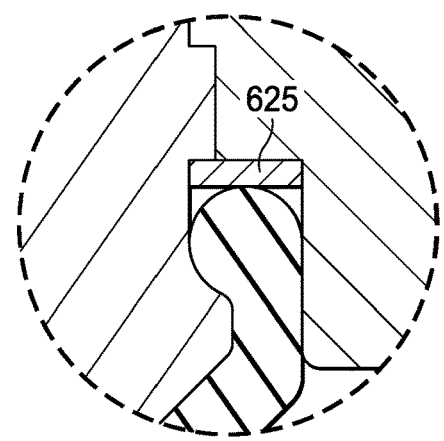
FIGS. 6 and 6A illustrate a top repairable gas-charged pulsation dampener using a low friction anti-torque gasket in accordance with embodiments of the present disclosure.
Figure 6:
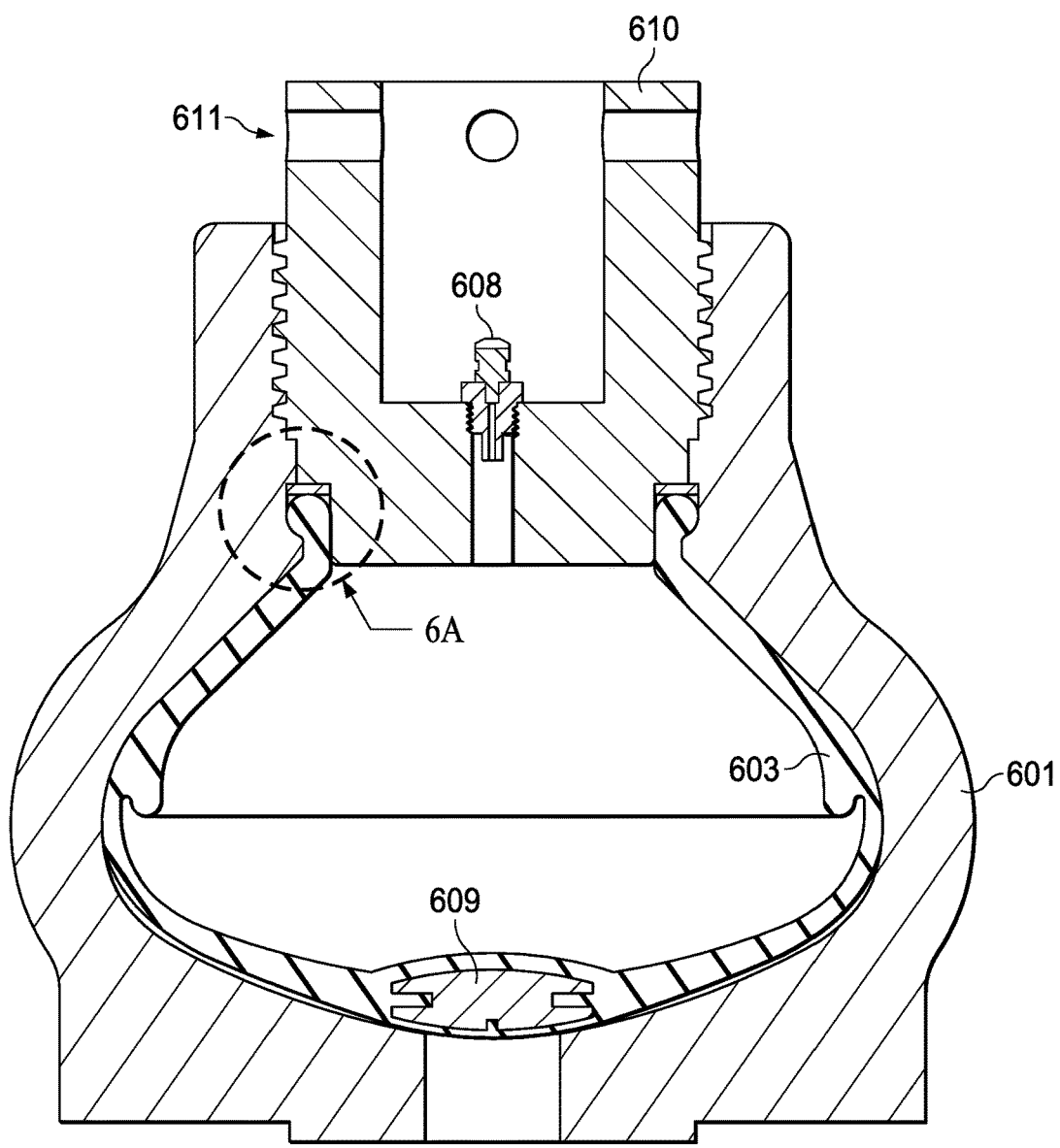

FIGS. 6 and 6A illustrate a top repairable gas-charged pulsation dampener using a low friction anti-torque gasket in accordance with embodiments of the present disclosure. FIGS. 6 and 6A are a side sectional view of the top repairable gas-charged pulsation dampener 600 and a detail of the sectional view taken at region A, respectively. FIGS.

6 and 6A are merely exemplary, for purposes of explaining the principles of the present disclosure, and are not intended to be limiting.

In general, the structure and operation of top repairable gas-charged pulsation dampener 600 is similar to that of pulsation dampeners 200, 300, 400 and 500. Similar to pulsation dampeners 200, 300, 400 and 500, pulsation dampener 600 includes a body 601 partially forming an enclosure within which is disposed a bladder 603. Pulsation dampener 600 includes a loading or charging valve 608, similar to charging valve 208, allowing the pulsation dampener 600 to be charged or recharged with gas. The bladder 603 is equipped with a double convex, anti-extrusion button 609 embedded within the bladder material similar to button 509. The manner in which bladder 603 is secured in position is similar to that described above for bladders 303, 403 and 503, and the bladder 603 is designed for use interchangeably within top repairable and bottom repairable gas charged pulsation dampeners. Accordingly, as with the embodiment of FIGS. 3, 4 and 5, repetitive description of features that are duplicative is omitted for simplicity and clarity.

Rather than a cap 310 as in the design of FIG. 3 or a combination of an externally threaded plug 410, 510 and pusher plate 402, 502 as in the designs of FIGS. 4 and 5, pulsation dampener 600 includes a unitary plug (or "top head") 610 completing the enclosure within which bladder 603 is disposed. Plug 610 is received by internal threading in the body 601, and may include a through-hole 611 for receiving a bar for tightening and loosening the plug. The use of a unitary plug 610 rather than a cap or plug/pusher plate combination may provide a securing mechanism that is shorter in height, not protruding as far above the body 601.

Because unitary plug 610 is rotated for installation and removal, and includes a surface bearing on the rim of the bladder 603 held between the body 601 and the plug 610, the plug 610 may exert torque on the rim of the bladder 603. Such torque could potentially strain or damage the bladder 603, possibly deteriorating the gas retention of the bladder 603 or the moisture barrier of the seal created by the manner in which bladder 603 is secured in place. In the embodiment of FIGS. 6 and 6A, an anti-torque (low friction) backup gasket 625 is disposed between a shoulder of the body 601 and the rim of the bladder 603, to reduce the likelihood of damage to the bladder 603 and the unitary plug 610 is screwed into position. Use of the backup gasket 625 also avoids water retention in the area of the bladder rim and eliminates any need to have a "dust cap" over the top of the pulsation dampener 600.

Figure 7A:
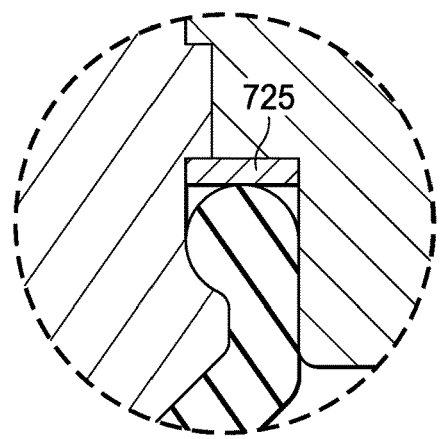
FIGS. 7 and 7A-7B illustrate a top repairable gas-charged pulsation dampener using a low friction anti-torque gasket in accordance with embodiments of the present disclosure.
Figure 7:
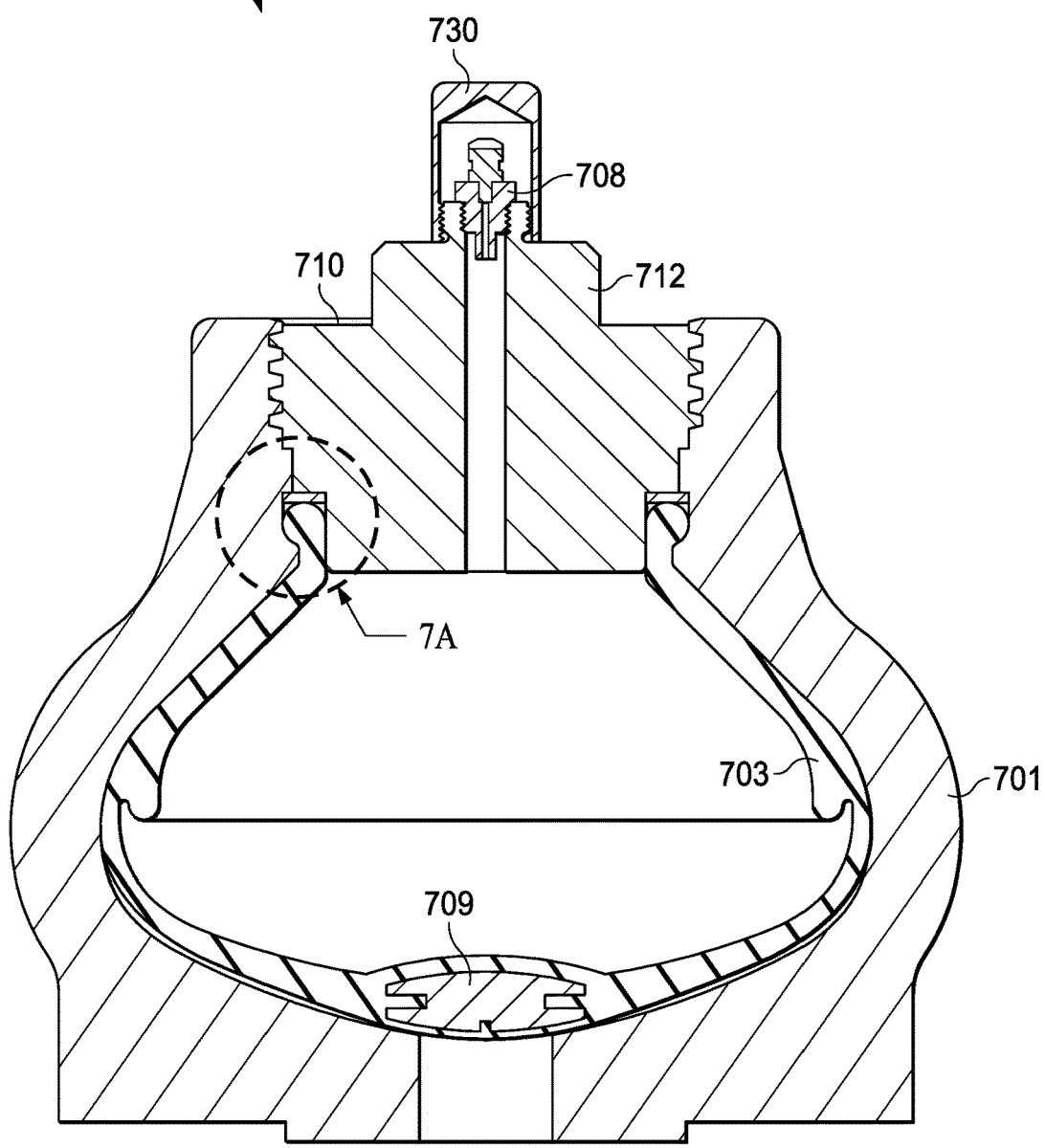
Figure 7B:
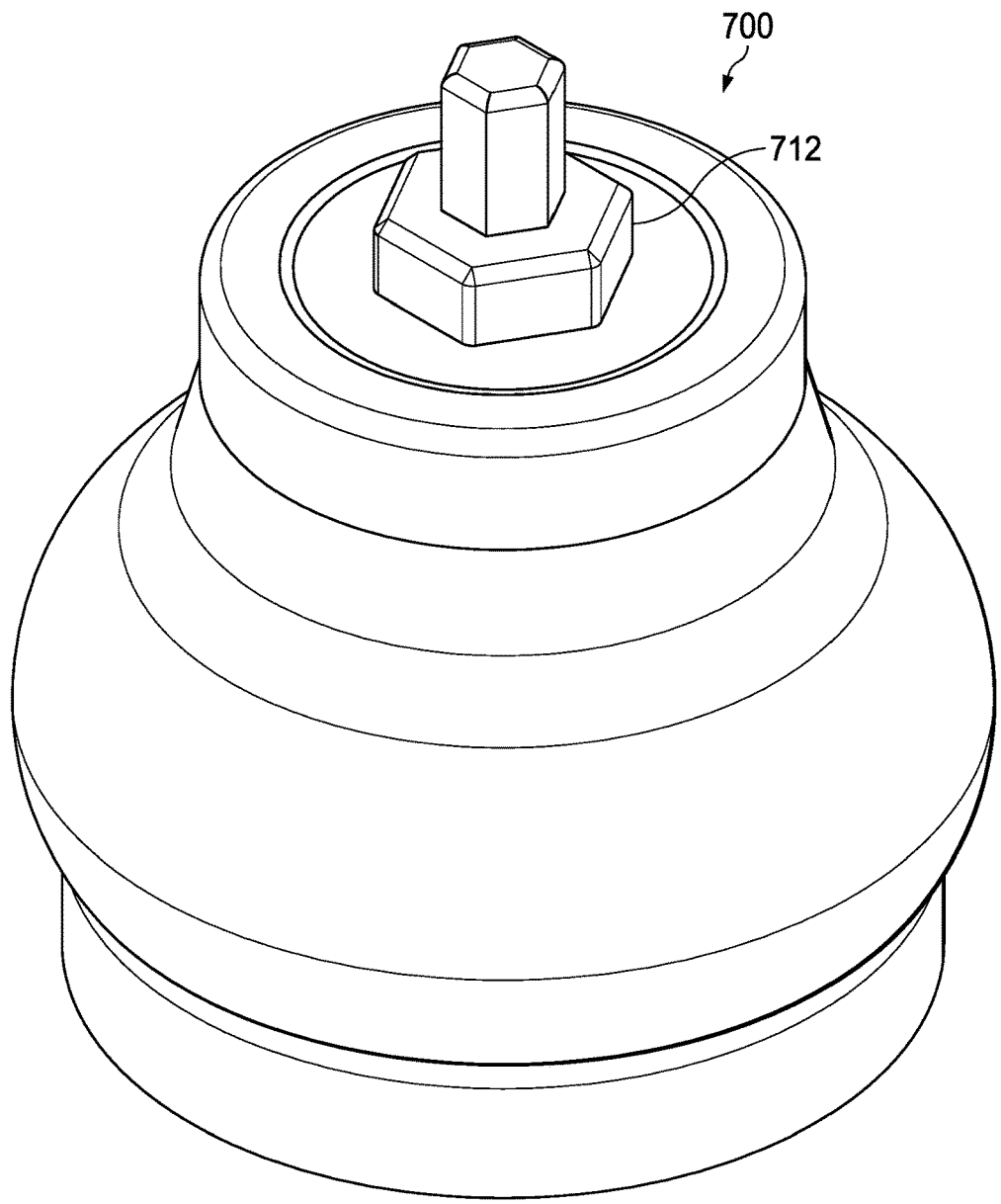

FIGS. 7 and 7A-7B illustrate a top repairable gas-charged pulsation dampener using a low friction anti-torque gasket in accordance with embodiments of the present disclosure. FIGS. 7 and 7A are a side sectional view of the top repairable gas-charged pulsation dampener 700 and a detail of the sectional view taken at region A, respectively, and FIG. 7B is a perspective view of the top repairable gas-charged pulsation dampener 700. FIGS. 7 and 7A-7B are merely exemplary, for purposes of explaining the principles of the present disclosure, and are not intended to be limiting.

In general, the structure and operation of top repairable gas-charged pulsation dampener 700 is similar to that of pulsation dampeners 200, 300, 400, 500 and 600. Similar to pulsation dampeners 200, 300, 400, 500 and 600, pulsation dampener 700 includes a body 701 partially forming an enclosure within which is disposed a bladder 703. Pulsation dampener 700 includes a loading or charging valve 708, similar to charging valves 208 and 608, allowing the pulsation dampener 700 to be charged or recharged with gas. The bladder 703 is equipped with a double convex, anti-extrusion button 709 embedded within the bladder material similar to buttons 509 and 609. The manner in which bladder 703 is secured in position is similar to that described above for bladders 303, 403, 503 and 603, and the bladder 703 is designed for use interchangeably within top repairable and bottom repairable gas charged pulsation dampeners. Pulsation dampener 700 also includes an anti-torque (low friction) backup gasket 725 is disposed between a shoulder of the body 701 and the rim of the bladder 703. Accordingly, as with the embodiment of FIGS. 3, 4, 5 and 6, repetitive description of features that are duplicative is omitted for simplicity and clarity.

Similar to the design of FIGS. 6 and 6A, pulsation dampener 700 includes a unitary plug (or "top head") 710 completing the enclosure within which bladder 703 is disposed. Plug 710 is received by internal threading in the body 701. Instead of a through-hole, however, plug 710 includes a hex nut 712 for tightening and loosening the plug. The use of a unitary plug 710 with such a hex nut 712 may provide a securing mechanism that is even shorter in height. However, a dust cap 730 over the valve 708 may be required.

As apparent, pulsation dampeners 200, 300, 400, 500, 600 and 700 are top repairable, eliminating a number of the steps for bladder replacement discussed above. For example, when replacement of the bladder in pulsation dampener 200, 300, 400, 500, 600, or 700 becomes necessary, the top cover plate 202, cap 310 and pusher plate 302, plug 410/510 and pusher plate 402/502, or unitary plug 610, 710 may be removed without either disconnection of the attachment of the pulsation dampener to the piping on which it is installed or movement/reorientation of the body 201, 301, 401, 501, 601, or 701, both of which are necessary for the bottom repairable design of FIG. 1. For each of the designs in FIGS. 2A-2B, 3A-3C, 4, 5, 6 and 6A and 7 and 7A, the old bladder may be removed and a new bladder installed with pulsation dampener 200, 300, 400, 500, 600, or 700 in place, mounted on the piping attachment. The repair time associated with bladder replacement is therefore significantly reduced. In addition, bladder replacement may be performed by a single service technician since lifting of the respective body 201, 301, 401, 501, 601 or 701 is not required.

Figure 8:
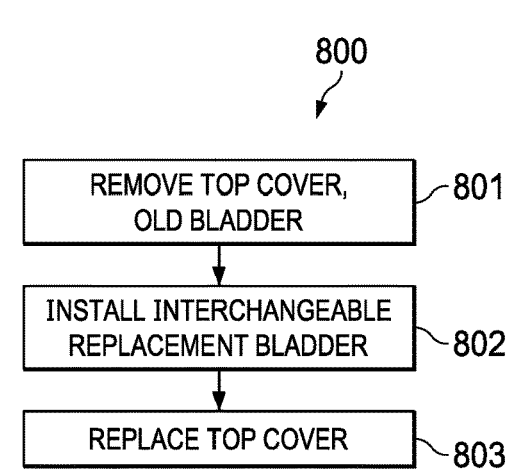
FIG. 8 illustrates a method of bladder replacement within top repairable gas-charged pulsation dampeners in accordance with embodiments of the present disclosure.

FIG. 8 illustrates a method of bladder replacement within top repairable gas-charged pulsation dampeners in accordance with embodiments of the present disclosure. The process 800 depicted in FIG. 8 may be performed for any of the pulsation dampener designs of FIGS. 2A-2B, FIGS. 3A-3C, FIG. 4, FIG. 5, FIGS. 6 and 6A, or FIGS. 7 and 7A-7B. FIG. 8 is merely exemplary, for purposes of explaining the principles of the present disclosure, and is not intended to be limiting.

The process 800 begins with removing the top cover, which may be a bolt-on cover plate 202, a cap 310 and pusher plate 302, a plug 410/510 and pusher plate 402/502, or a unitary plug 610/710 as well as the old bladder to be replaced (step 801). An interchangeable replacement bladder is installed (step 802). As used herein, "interchangeable replacement bladder" refers to a bladder that is suitable for both top repairable and bottom repairable gas-charged pulsation dampeners. At a minimum, an interchangeable replacement bladder must have a size (gas volume capacity) and be formed of material suitable for both types of dampener, and must be designed to be secured within the pulsation dampener enclosure in the same manner for both types. Optionally, the bladder may include a double convex button. The process concludes with securing the top cover (step 803).

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A top repairable gas-charged pulsation dampener, comprising:
   a body having a bottom opening for receiving and discharging pumped fluid and a top opening for installing or replacing a bladder; and
   a threaded top cover over the top opening, the threaded top cover comprising a threaded plug filling the opening and protruding above the body, wherein a rim of the bladder is compressed between the threaded plug and the body; and
   a low friction gasket between the threaded plug and the rim of the bladder,
   wherein the bladder is secured by the body and the threaded top cover.

2. The top repairable gas-charged pulsation dampener according to claim 1, wherein the threaded top cover comprises:
   a pusher plate across a top opening in the body; and
   one of a threaded cap and the threaded plug securing the pusher plate in position relative to the body,
   wherein the rim of the bladder is compressed between the pusher plate and the body.

3. A top repairable gas-charged pulsation dampener, comprising:
   a body having a bottom opening for receiving and discharging pumped fluid and a top opening for installing or replacing a bladder;
   a threaded top cover over the top opening, the threaded top cover comprising a threaded plug filling the opening and protruding above the body, wherein a rim of the bladder is compressed between the threaded plug and the body; and
   a through-hole within a portion of the threaded plug protruding above the body,
   wherein the bladder is secured by the body and the threaded top cover.

4. The top repairable gas-charged pulsation dampener according to claim 1, further comprising:
   a hex nut within a portion of the threaded plug protruding above the body.

5. The top repairable gas-charged pulsation dampener according to claim 1, wherein the bladder includes a double convex button.

6. A top repairable gas-charged pulsation dampener, comprising:
   a body having a bottom opening for receiving and discharging pumped fluid and a top opening for installing or replacing a bladder;
   a top cover over the top opening, the top cover comprising a threaded plug filling the opening and protruding above the body, wherein a rim of the bladder is compressed between the threaded plug and the body;
   a low friction gasket between the threaded plug and the rim of the bladder; and
   the bladder secured by the body and the top cover,
   wherein the bladder is secured by compression of the rim of the bladder between the body and the top cover, and
   wherein the bladder is interchangeable with bladders for bottom repairable gas charged pulsation dampeners.

7. The top repairable gas-charged pulsation dampener according to claim 6, wherein the top cover comprises:
   a pusher plate across the top opening in the body; and
   one of a threaded cap and the threaded plug securing the pusher plate in position relative to the body,
   wherein the rim of the bladder is compressed between the pusher plate and the body.

8. A top repairable gas-charged pulsation dampener, further comprising:
   a body having a bottom opening for receiving and discharging pumped fluid and a top opening for installing or replacing a bladder;
   a top cover over the top opening;
   the bladder secured by the body and the top cover; and
   a through-hole within a portion of a threaded plug protruding above the body,
   wherein the bladder is interchangeable with bladders for bottom repairable gas charged pulsation dampeners, and
   wherein the bladder is interchangeable with bladders for bottom repairable gas charged pulsation dampeners.

9. The top repairable gas-charged pulsation dampener according to claim 6, further comprising:
   a hex nut within a portion of the threaded plug protruding above the body.

10. The top repairable gas-charged pulsation dampener according to claim 6, wherein the bladder includes a double convex button.

11. A bladder for either a top repairable gas-charged pulsation dampener or a bottom repairable gas-charged pulsation dampener, the bladder comprising:
   a bladder body having a rim around a neck of the bladder body, the rim configured to be secured by compression between a pulsation dampener body and a cover for a repair opening in the pulsation dampener body, wherein the rim includes a bridge portion and a bulb portion of circular cross-section having a diameter greater than a thickness the bridge portion; and
   a double convex button on a portion of the bladder body opposite the neck.

* * * * *